US012747988B2

(12) United States Patent
Vaillant et al.

(10) Patent No.: US 12,747,988 B2
(45) Date of Patent: Sep. 29, 2026

(54) POLARIMETRIC IMAGE SENSOR

(71) Applicants: STMicroelectronics International N.V., Geneva (CH); STMicroelectronics (Crolles 2) SAS, Crolles (FR)

(72) Inventors: Jerome Vaillant, Grenoble (FR); Francois Deneuville, Grenoble (FR); Axel Crocherie, Grenoble (FR); Alain Ostrovsky, Grenoble (FR)

(73) Assignees: STMicroelectronics International N.V., Plan-les-Quates (CH); STMicroelectronics (Crolles 2) SAS, Crolles (FR)

( * ) Notice: Subject to any disclaimer, the term of this patent is extended or adjusted under 35 U.S.C. 154(b) by 711 days.

(21) Appl. No.: 18/186,102

(22) Filed: Mar. 17, 2023

(65) Prior Publication Data

US 2024/0053202 A1 Feb. 15, 2024

(30) Foreign Application Priority Data

Aug. 9, 2022 (FR) ....................................... 2208214

(51) Int. Cl.
*G01J 3/447* (2006.01)
*G01J 3/18* (2006.01)

(52) U.S. Cl.
CPC ................. *G01J 3/447* (2013.01); *G01J 3/18* (2013.01)

(58) Field of Classification Search
CPC G01J 3/447; G01J 3/18; H10F 39/807; H10F 39/8053
See application file for complete search history.

(56) References Cited

U.S. PATENT DOCUMENTS

| | | | |
|---|---|---|---|
| 2019/0019832 A1 | 1/2019 | Zhao et al. | |
| 2020/0335540 A1 | 10/2020 | Sugizaki | |
| 2021/0057475 A1 | 2/2021 | Yamazaki et al. | |
| 2021/0190593 A1 | 6/2021 | Yao et al. | |
| 2021/0333150 A1 | 10/2021 | McEldowney et al. | |

FOREIGN PATENT DOCUMENTS

| | | | |
|---|---|---|---|
| CN | 110546763 A | * 12/2019 | ........... G02B 5/3058 |
| CN | 111090176 A | 5/2020 | |

(Continued)

OTHER PUBLICATIONS

E-learning, "Internal structure of a liquid crystal or LCD TV screen" https://www.youtube.com/watch?v=Gx-JVoOFYhs, hereafter e-learning, Jan. 23, 2022 (Year: 2022).*

(Continued)

*Primary Examiner* — Maurice C Smith
(74) *Attorney, Agent, or Firm* — Seed Intellectual Property Law Group LLP

(57) ABSTRACT

The present description concerns a polarimetric image sensor formed inside and on top of a semiconductor substrate, the second comprising a plurality of pixels, each comprising: —a photosensitive region formed in the semiconductor substrate; —a diffraction structure formed on the side of an illumination surface of the photosensitive region; and —a polarization structure formed on the side of the diffraction structure opposite to the photosensitive region.

20 Claims, 4 Drawing Sheets

(56) References Cited

FOREIGN PATENT DOCUMENTS

| | | | | | | |
|---|---|---|---|---|---|---|
| CN | 111240082 | A | * | 6/2020 | ....... | G02F 1/133504 |
| KR | 100954917 | B1 | | 4/2010 | | |

OTHER PUBLICATIONS

Camayd-Muñoz et al., "Multi-functional volumetric meta-optics for color and polarization image sensors," Optica vol. 7, Issue 4, 2020, 5 pages.
Li et al., "Empowering Metasurfaces with Inverse Design: Principles and Applications," ACS Photonics 2022, 9, pp. 2178-2192.
Rubin et al., "Matrix Fourier optics enables a compact full-Stokes polarization camera," Science 365, 43 (2019), 8 pages.

* cited by examiner

POLARIMETRIC IMAGE SENSOR

BACKGROUND

Technical Field

The present disclosure generally concerns image sensors, and more particularly is directed to image sensors called polarimetric, adapted to recording information relative to the polarization of the captured light.

Description of the Related Art

The measurement of the light polarization information on acquisition of an image may be advantageous for many applications. It enables in particular to implement image improvement processings, adapted according to the considered application. For example, it enables to decrease or conversely to enhance reflections on an image of a surface such as a glass pane or water. It further makes it possible to detect manufactured objects in a natural environment (camouflage detection or demining applications, for example), the latter generally having a polarization signature. Among the applications likely to take advantage of the measurement of the polarization information, one may also mention industrial control applications, biomedical applications, for example, contrast improvement applications for the capture of images in a diffusing medium (fog, submarine imaging, etc.), or also applications of distance mapping or depth image acquisition, where the polarization may provide information relative to the orientation of the surface of the manufactured objects, and thus help the 3D reconstruction as a complement to another modality such as the active illumination by structured light or by time-of-flight measurement.

To measure the polarization information, it has already been provided to successively acquire, by means of a same sensor, a plurality of images of a same scene, by placing at each acquisition a polarizer in front of the sensor, and by changing polarizer between two successive acquisitions. This results in relatively bulky acquisition systems, with the presence in front of the sensor of a mechanism, for example a motor-driven rotating wheel or platen having the different polarizers fixed thereto, enabling to change the polarizer between two acquisitions. Another limitation is linked to the need to successively acquire a plurality of images of the scene to record a plurality of polarization states. This may in particular raise an issue when the scene varies over time.

To overcome these limitations, it has been provided to place an array of polarizing filters in front of the image sensor. There however remains a limitation in that the polarizing filters block part of the light signal received by the acquisition system. Thus the general sensitivity or general quantum efficiency of the acquisition system is relatively low.

It would be desirable to at least partly overcome certain limitations of known solutions of polarimetric image acquisition.

BRIEF SUMMARY

For this purpose, an embodiment provides a polarimetric image sensor formed inside and on top of a semiconductor substrate, the sensor comprising a plurality of pixels, each comprising:

- a photosensitive region formed in the semiconductor substrate;
- a diffraction structure formed on the side of an illumination surface of the photosensitive region; and
- a polarization structure formed on the side of the diffraction structure opposite to the photosensitive region.

According to an embodiment, the plurality of pixels comprises at least first and second pixels adapted to measuring radiations according respectively to first and second distinct polarizations, wherein:

- the polarization structure of the first pixel is adapted to mainly transmitting radiations according to the first polarization and the polarization structure of the second pixel is adapted to mainly transmitting radiations according to the second polarization; and
- the diffraction structure of the first pixel is adapted to favoring the absorption, in the photosensitive region of the pixel, of radiations according to the first polarization with respect over radiations according to the second polarization, and the diffraction structure of the second pixel is adapted to favoring the absorption, in the photosensitive region of the pixel, of radiations according to the second polarization over radiations according to the first polarization.

According to an embodiment, in each pixel, the polarization structure of the pixel comprises a plurality of parallel bars.

According to an embodiment, the parallel bars are metallic.

According to an embodiment, in each pixel, the diffraction structure of the pixel comprises a plurality of cavities or trenches extending vertically in the substrate on the side of the illumination surface of the photosensitive region.

According to an embodiment, the cavities or trenches extend down to a depth in the range from 50 to 500 nm.

According to an embodiment, the plurality of pixels comprises different pixels adapted to measuring radiations in different wavelength ranges, and, in each pixel, the polarization structure and/or the diffraction structure are adapted according to the wavelength range intended to be measured by the pixel.

According to an embodiment, in each pixel, the polarization structure and/or the diffraction structure are adapted according to the angle of incidence of the radiations received by the pixel.

According to an embodiment, the sensor comprises an interconnection stack covering a surface of the substrate opposite to the diffraction structures and to the polarization structures.

According to an embodiment, the polarization structures are polarizing filters.

According to an embodiment, the polarization structures are polarization routers.

BRIEF DESCRIPTION OF THE SEVERAL VIEWS OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the photodetection elements and the electronic control circuits of the described image sensors have not been detailed, the described embodiment being compatible with usual embodiments of these elements. Further, the possible applications that the described image sensors have not been detailed, the described embodiments being compatible with all or most known applications of polarimetric image acquisition devices.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, when reference is made to absolute positional qualifiers, such as the terms “front”, “back”, “top”, “bottom”, “left”, “right”, etc., or to relative positional qualifiers, such as the terms “above”, “below”, “upper”, “lower”, etc., or to qualifiers of orientation, such as “horizontal”, “vertical”, etc., reference is made, unless specified otherwise, to the orientation of the figures.

Unless specified otherwise, the expressions “around”, “approximately”, “substantially” and “in the order of” signify within 10%, and preferably within 5%.

Figure 1:
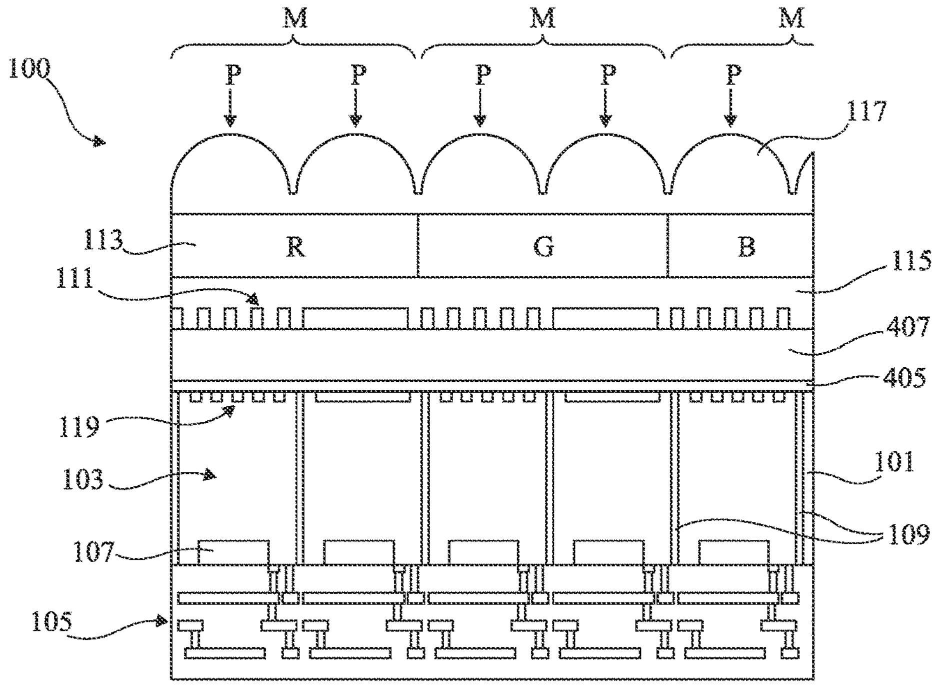
FIG. 1 is a partial simplified cross-section views of an example of a polarimetric image sensor according to an embodiment.

FIG. 1 is a partial and simplified cross-section view of an example of a polarimetric image sensor 100 according to an embodiment.

Sensor 100 is formed inside and on top of semiconductor substrate 101. Substrate 101 is for example made of a single-crystal semiconductor material. Substrate 101 is for example made of silicon, for example, of single-crystal silicon.

Sensor 100 comprises a plurality of pixels P formed inside and on top of semiconductor substrate 101. In top view, pixels P are for example arranged in an array of rows and columns.

Sensor 100 further comprises, on the side of a first surface of substrate 101, called front side, corresponding to the lower surface of substrate 101 in the orientation of the drawing, a stack 105 of insulating and conductive layers (for example, metallic), called interconnection stack, having elements of interconnection (for example, interconnection conductive tracks and vias) of the sensor pixels, formed therein.

In the example of FIG. 1, sensor 100 is a back-side illumination sensor, also called BSI sensor, that it, the light rays originating from the scene to be imaged illuminate the substrate on its back side, that is, its surface opposite to interconnection stack 105, that is, its upper surface in the orientation of FIG. 1.

Each pixel P of sensor 100 comprises a photosensitive region 103 formed in substrate 101. Each photosensitive region 103 for example comprises a photodetection element 107, for example, a photodiode. In the shown example, the photosensitive regions 103 of pixels P are laterally separated from one another by insulating walls 109. Insulating walls 109 are for example made of a dielectric material, for example, silicon oxide. As a variant (not detailed in the drawings), insulating walls 109 comprise external lateral walls made of a dielectric material, for example, silicon oxide, and a central wall made of an electrically-conductive material, for example, doped polysilicon or a metal. In this example, insulating walls 109 extend vertically through the entire thickness of substrate 101. The thickness of substrate 101 is for example in the range from 1 to 20 μm, for example, from 3 to 10 μm. As a variant, insulating walls 109 may be omitted.

Each pixel P comprises a polarization structure 111, for example, a polarizing filter, arranged in front of the photosensitive region 103 of the pixel, on the side of the illumination surface of photosensitive region 103, that is, on the upper surface side of substrate 101 in the orientation of FIG. 1.

Each polarization structure 111 is adapted to mainly transmitting light rays according to a predefined polarization.

In the example of FIG. 1, the sensor comprises a plurality of pixels P having their respective polarization structures 111 having different polarization orientations and thus being adapted to mainly transmitting light rays according to different polarizations. This enables to measure, by means of distinct pixels, intensities of light radiations received according to different polarizations. In other words, the sensor comprises at least first and second pixels P intended to measure intensities of light rays received respectively according to first and second polarizations, for example, first and second orthogonal linear polarizations. As an example, the polarization structure 111 of the first pixel has a transmission factor for radiations according to the first polarization greater than its transmission factor for radiations according to the second polarization, and the polarization structure 111 of the second pixel has a transmission factor for radiations according to the second polarization greater than its transmission factor for radiations according to the first polarization.

The polarization structures are for example metal structures comprising openings and mainly transmitting radiations according to the predefined polarization, and absorbing or reflecting radiations according to the other polarizations. The metal structures are for example made of aluminum or of copper. As a variant, other metals may be used, for example, silver, gold, tungsten, or titanium.

As an example, a filling material 115, for example, a dielectric material, for example, silicon oxide, silicon nitride, alumina ($Al_2O_3$), tantalum oxide, or hafnium oxide, fills the openings formed in the metal structures. In this example, material 115 further covers polarization structures 111, forming a planarization layer 115. As a variant, the openings of polarization structures 111 may be left vacant or filled with air.

In practice, the selection of the patterns and the sizing of polarization structures 111 may be performed by means of known electromagnetic simulation tools.

As an example, pixels P are distributed into macropixels M, each comprising at least two adjacent pixels P. In each macropixel M, the pixels P of the macropixel have different polarization structures 111. Thus, in each macropixel M, the pixels P of the macropixel measure light radiation intensities received according to different polarizations.

Figure 2:
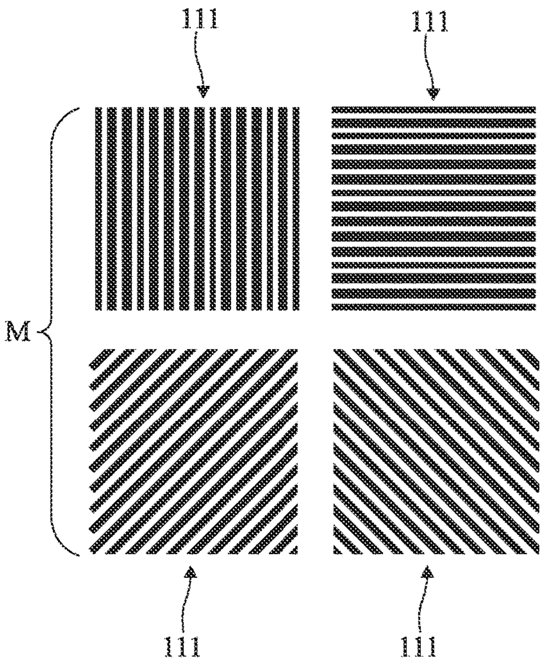
FIG. 2 is a simplified top view of an example of embodiment of polarization structures of the sensor of FIG. 1.

FIG. 2 schematically illustrates the polarization structures 111 of the pixels P of a same macropixel M. In this example, each macropixel M comprises four adjacent pixels P adapted to measuring light radiation intensities received respectively according to four different polarization orientations, for example, linear polarizations according to respectively four directions respectively forming 0°, 90°, +45°, and −45° angles with respect to a reference direction. In this example, the four pixels P are arranged in an array of two rows and two columns.

The polarization structures are for example metal gates, each formed of a plurality of regularly spaced apart parallel metal bars, mainly transmitting radiations according to a linear polarization perpendicular to the metal bars, and absorbing radiations according to the other polarizations.

As a variant, the number of pixels P per macropixel M may be different from four. Further, the described embodiments are not limited to linear polarization structures 111. AS a variant, each macropixel M may comprises one or a plurality of linear polarization structures 111 and/or one of a plurality of circular polarization structures 111.

As an example, the polarization structures 111 of the pixels P of same position in the different macropixels M of the sensor are adapted to mainly transmitting the same polarization orientation.

As an example, the polarization structures 111 of same polarization orientation in the different macropixels M of the sensor are all identical, to within manufacturing dispersions.

As a variant, the polarization structures 111 of same polarization orientation in the different macropixels M of the sensor have patterns adapted according to the position of macropixel M on the sensor, to take into account the main direction of incidence of the light rays received by the macropixel.

In the example of FIG. 1, each pixel P of sensor 100 comprises a color filter 113 arranged above the polarization structure and adapted to transmitting light mainly in a determined wavelength range. Different pixels P may comprise different color pixels 113. As an example, the sensor comprises pixels P comprising a color filter 113 adapted to mainly transmitting red light (R), pixels P comprising a color filter 113 adapted to mainly transmitting green light (G), and pixels P comprising a color filter 113 adapted to mainly transmitting blue light (B). As an example, the pixels P of a same macropixel M comprise identical color filters 113, and the pixels P of neighboring macropixels M comprise different color filters. Color filters 113 are for example made of colored resin.

As an example, the polarization structures 111 of same polarization orientation in the different macropixels M of the sensor have patterns adapted according to the pixel color, that is, to the wavelength range mainly transmitted by the color filter 113 of the pixel.

As a non-limiting example, for linear polarizations of the type illustrated in FIG. 2, made of aluminum with a silicon oxide filling and intended to operate at visible and/or infrared wavelengths, the sizing of the metal bars may be as follows:

- for blue light with a wavelength in the order of 450 nm (and/or for light of higher wavelength, for example, infrared light), the metal bars may have a height in the range from 50 to 100 nm, a width in the order of 60 nm, and a repetition period in the order of 180 nm;
- for green light with a wavelength in the order of 530 nm (and/or for light of higher wavelength, for example, infrared light), the metal bars may have a height in the range from 50 to 100 nm, a width in the order of 70 nm, and a repetition period in the order of 210 nm;
- for red light with a wavelength in the order of 610 nm (and/or for light of higher wavelength, for example, infrared light), the metal bars may have a height in the range from 50 to 100 nm, a width in the order of 80 nm, and a repetition period in the order of 240 nm; and
- for infrared light with a wavelength in the order of 940 nm or higher, the metal bars may have a height in the range from 50 to 100 nm, a width in the order of 90 nm, and a repetition period in the order of 280 nm.

In practice, for reasons of manufacturing method simplification, it is preferable for the height of the metal bars of polarization structures 111 to be the same in all the sensor pixels P. Thus, compromises may be made between the complexity of forming of polarizers 111 and their polarization filtering performance.

In the example of FIG. 1, color filters 113 are arranged above planarization layer 115, for example, in contact, by their lower surface, with the upper surface of layer 115.

In the example of FIG. 1, each pixel P of sensor 100 further comprises a microlens 117 topping the polarization structure 111 of the pixel, adapted to focusing the incident light in the photosensitive region 103 of the pixel. In the shown example, each microlens 117 is arranged above the color filter 113 of the pixel and is for example in contact, by its lower surface, with the upper surface of color filter 113.

According to an aspect of an embodiment, each pixel P of sensor 100 further comprises a diffraction structure 119 formed on the side of the illumination surface of the photosensitive region 103 of the pixel, that is, on the side of its upper surface in the orientation of FIG. 1. The diffraction structure is arranged between photosensitive region 103 and polarization structure 111, for example in contact with the upper surface of substrate 101.

In the shown example, the diffraction structure comprises structures, for example, cavities or trenches, formed in substrate 101 on the upper surface side of the photosensitive region 103 of the pixel. The structures are for example filled with a material having a refraction index different from that of the material of the substrate, for example, silicon oxide. The structures for example have a lateral dimension in the order of $\lambda/N$, $\lambda$ designating the main wavelength of sensitivity of the pixel, that is, for example, the wavelength for which the quantum efficiency of the pixel is maximum, or the main wavelength intended to be measured by the pixel, and N being the refraction index of the substrate, for example, made of silicon, in order to be placed in diffraction mode.

In each pixel P, structure 119 enables to diffract the light at the input in the semiconductor material of the substrate, to increase the length of the optical path of the rays in the photosensitive region 103 of the pixel, and thus favor the absorption, and accordingly the photoconversion, of the incident rays by the photosensitive region 103 of the pixel.

As an example, the diffraction structures 119 of the different pixels P of the sensor are adapted according to the main wavelength intended to be measured by the pixel and/or to the main angle of incidence of the rays reaching the pixel (that is, according to the position of the pixel in the sensor).

According to an aspect of the embodiment of FIG. 1, in each pixel P of the sensor, the diffraction structure 119 of the pixel is adapted to the polarization intended to be mainly measured by the pixel, called pixel polarization, to favor the absorption of radiations in photosensitive region 103 mainly according to the pixel polarization. In other words, the pattern of diffraction structure 119 is selected so that the absorption of the radiations polarized according to the pixel polarization (defined by polarization structure 111) is greater than the absorption of the radiations according to the other polarizations.

Thus, in the embodiment of FIG. 1, pixels P comprising different polarization structures 111 comprise different diffraction structures 119.

The presence of diffraction structures 119 enables, in each pixel, to improve the sensitivity to the pixel polarization, that is, the quantum efficiency of the pixel illuminated according to the pixel polarization. Diffraction structures 119 further enable to increase the extinction coefficient or contrast of the pixels, that is, in each pixel, the ratio of the quantum efficiency of the pixel illuminated according to the pixel polarization to the quantum efficiency of the pixel illuminated according to the polarization orthogonal to the pixel polarization.

Diffraction structures 119 are for example strongly asymmetrical to favor the diffraction of light according to the pixel polarization over the other polarizations.

The selection of the patterns and the sizing of diffraction structures 119 may be performed by means of electromagnetic simulation tools.

Figure 3:
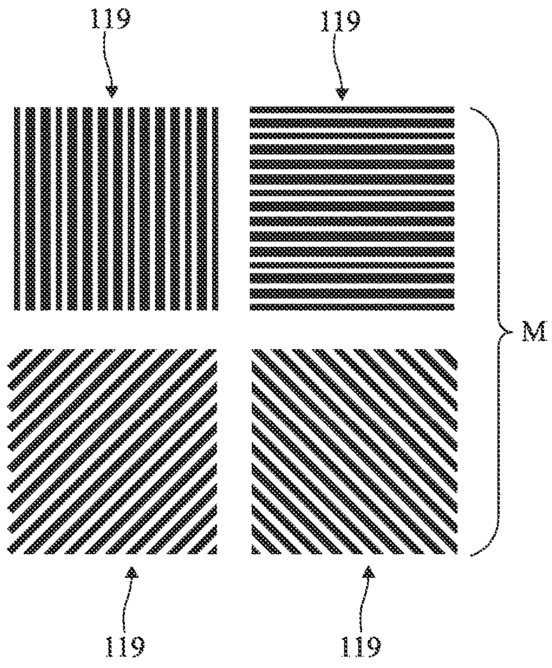
FIG. 3 is a simplified top view of an example of embodiment of diffraction structures of the sensor of FIG. 1.

FIG. 3 schematically illustrates an example of forming of the diffraction structures 119 of the pixels P of the macropixel M of FIG. 2. In this example, in each pixel, polarization structure 119 is formed of trenches parallel to the metal bars of the polarization structure 111 of the pixel, extending vertically in substrate 101 from the upper surface of substrate 101.

It should however be noted that polarization structures 111 and diffraction structures 119 may be different in terms of design and of materials, and do not use the same physical principles. In particular, the role of polarization structures 111 is to mainly transmit the main pixel polarization and to absorb or reflect the other polarizations, while the role of diffraction structure 119 is to more strongly diffract the main pixel polarization with respect to the other polarizations.

As a result, the structures 111 and 119 of a same pixel P do not necessarily have the same main axis and their respective orientations may depend on parameters such as the wavelength, the aperture ratio, and/or the size of the pixel.

Thus, as a variant, not shown, each diffraction structure 119 may be formed of trenches orthogonal to the metal bars of the polarization structure 111 of the pixel.

It should further be noted that the lateral dimensions and the repetition period of the trenches of diffraction structures 119 are not necessarily identical to the lateral dimensions and to the repetition period of the metal bars of polarization structures 111. Further, the depth of the trenches of the diffraction structure may be different from the height of the metal bars of the polarization structures.

In the example considered hereabove where each macropixel M comprises a plurality of pixels P adapted to respectively measuring different linear polarizations, the polarization structures 111 of the different pixels for example have the same pattern, rotated by an angle θ equal to the angle formed between the polarization direction to be measured and a reference direction. Similarly, the diffraction structures 119 of the different pixels for example have the same pattern, also rotated by angle θ.

FIGS. 4A to 4I are cross-section views illustrating successive steps of an example of a method of manufacturing the sensor 100 of FIG. 1.

Figure 4A:
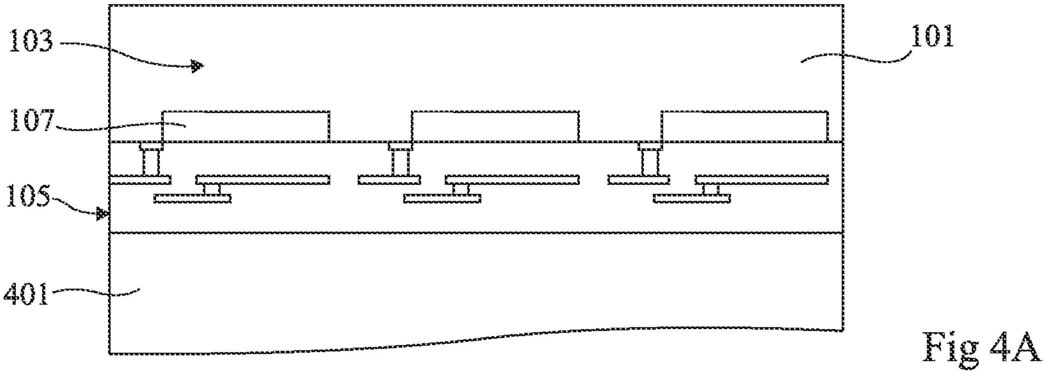
FIG. 4A, FIG. 4B, FIG. 4C, FIG. 4D, FIG. 4E, FIG. 4F, FIG. 4G, FIG. 4H, and FIG. 4I are cross-section views illustrating successive steps of an example of a method of manufacturing the sensor of FIG. 1.

FIG. 4A illustrates an intermediate structure at the end of a step of forming of photodetectors 107 in substrate 101, on the lower surface side of the substrate, then of a step of forming of interconnection stack 105 on the lower surface of the substrate. Control and/or readout transistors, not detailed in the drawings, may further be formed inside and on top of the lower surface of the substrate, before the forming of interconnection stack 105.

In the example of FIG. 4A, after the forming of photodetectors 107 and of interconnection stack 105, substrate 101 is thinned from its back side, that is, its upper surface in the orientation of FIG. 4A.

Before the thinning step, a substrate 401, used as a support handle, is bonded, by its lower surface, to the lower surface of interconnection stack 105.

It should be noted that in the cross-section views of FIGS. 4A to 4I, the walls 109 of lateral insulation of the pixels have not been shown. Walls 109 may be formed on the front surface side of substrate 101, before the forming of interconnection stack 105, or from the back side of substrate 101, after the substrate thinning step.

Figure 4B:
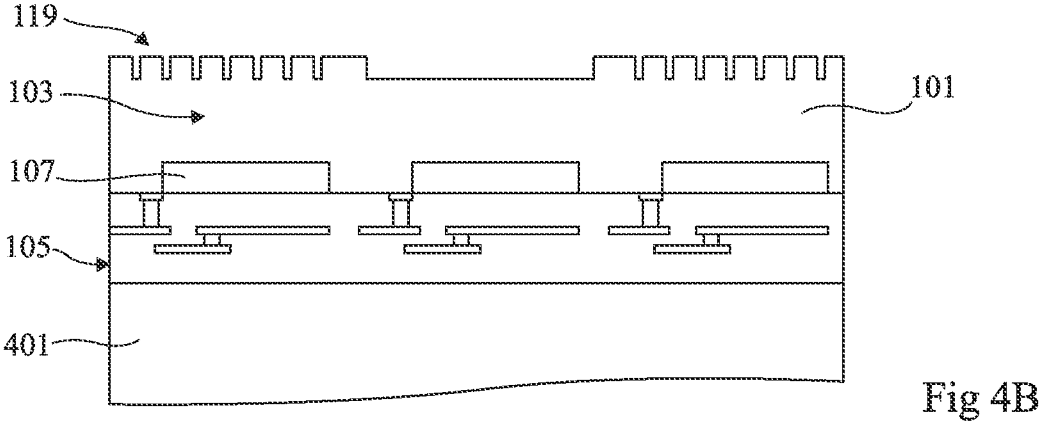

FIG. 4B illustrates the structure obtained at the end of a step of etching of local trenches in substrate 101, on the back side of substrate 101, to form the diffraction structures 119 of the pixels. The trenches etched at this step for example have a depth in the range from 50 to 500 nm.

Figure 4C:
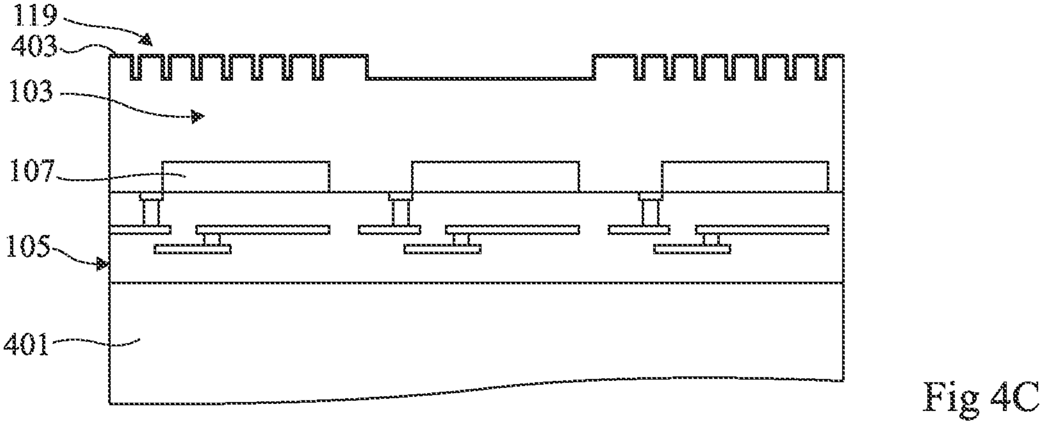

FIG. 4C illustrates the structure obtained at the end of a step of deposition of a passivation layer 403, for example made of a dielectric material, on top of and in contact with the upper surface of substrate 102 at the end of the etching step of FIG. 4B. Layer 403 is for example deposition continuously and with a substantially uniform thickness over the entire upper surface of the structure of FIG. 4B. Layer 403 is for example deposited by a conformal deposition method. The thickness of layer 403 is for example relatively small so that layer 403 does not entirely fill the trenches. As an example, the thickness of layer 403 is in the range from 1 to 20 nm, for example, from 1 to 10 nm. Layer 403 is for example made of an electrically charged oxide, for example, alumina ($Al_2O_3$) or hafnium oxide ($HfO_2$).

Figure 4D:
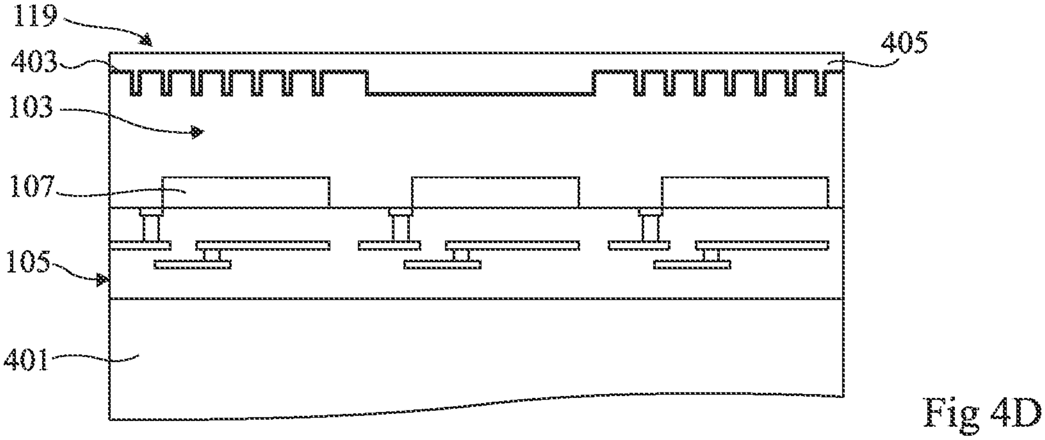

FIG. 4D illustrates the structure obtained at the end of a step of deposition of a planarization layer 405 filling the trenches of diffraction structures 119 and covering diffraction structures 119. In this example, layer 405 has a substantially planar upper surface extending over the entire surface of the sensor. Layer 405 is for example made of silicon oxide or of silicon nitride.

Figure 4E:
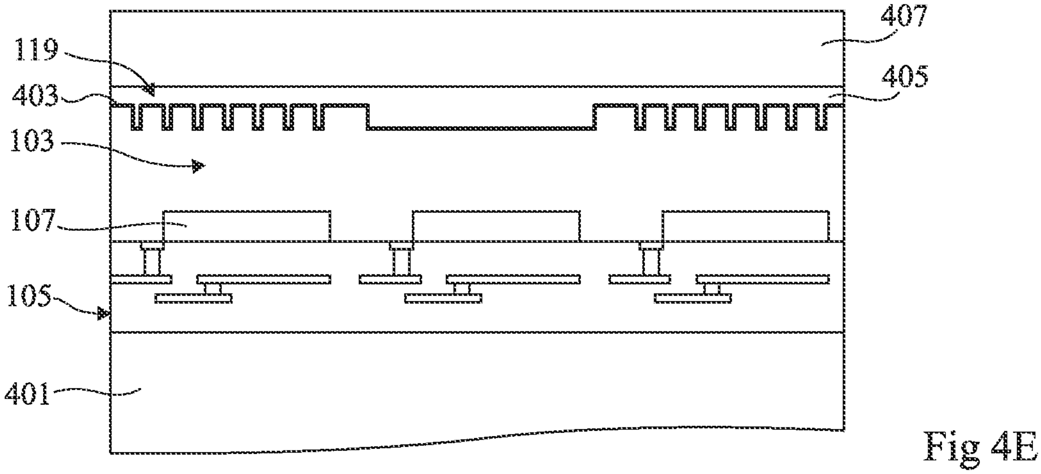

FIG. 4E illustrates the structure obtained at the end of a step of deposition of an optional transparent layer 407 having an optical spacer function, on the upper surface of layer 405. Layer 407 is for example made of a transparent material of relatively low refraction index, for example, smaller than 2.

Figure 4F:
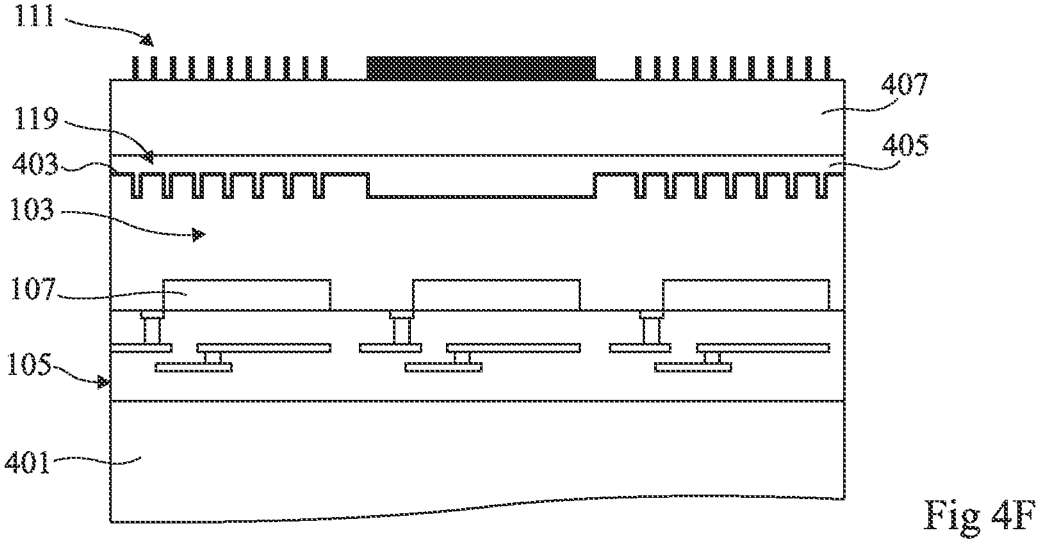

FIG. 4F illustrates the structure obtained at the end of a step of forming of the polarization structures 111 of the sensor, for example, made of metal, on the upper surface of layer 407. As an example, a metal layer, for example, made of aluminum, is first deposited continuously and with a uniform thickness over the entire upper surface of the structure, and then locally removed, for example, by photolithography and etching, to define polarizers 111.

Figure 4G:
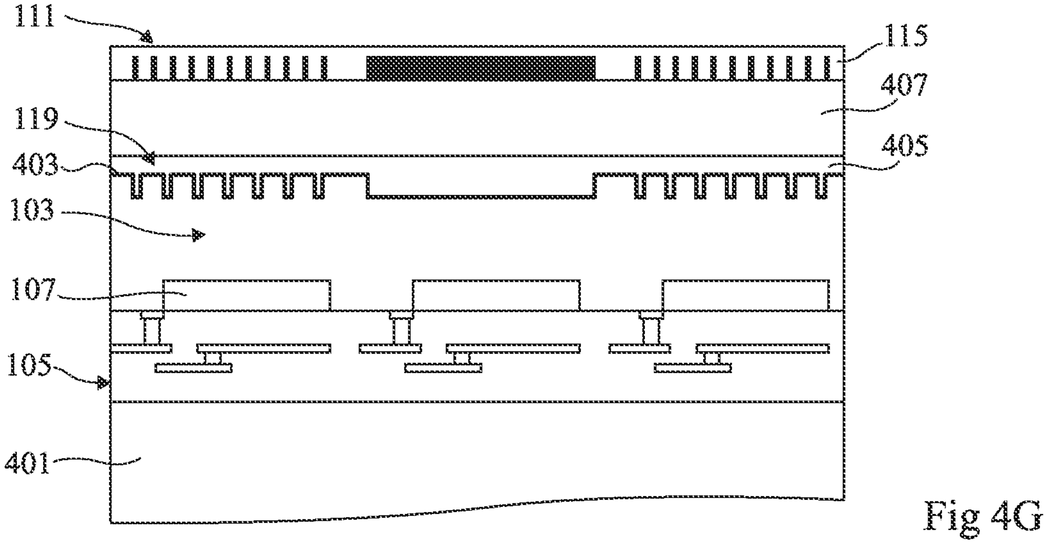

FIG. 4G illustrates the structure obtained at the end of a step of deposition of the transparent planarization layer 115 filling the openings of polarizers 111 and covering polarizers 111.

Figure 4H:
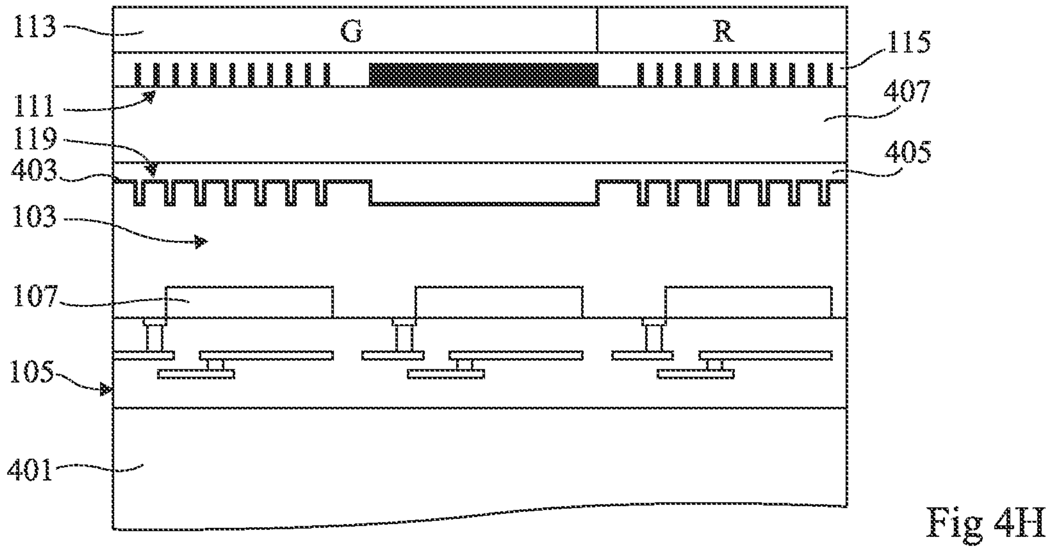

FIG. 4H illustrates the structure obtained at the end of a step of forming of color filters 113, for example, made of resin, on the upper surface of the structure of FIG. 4G.

Figure 4I:
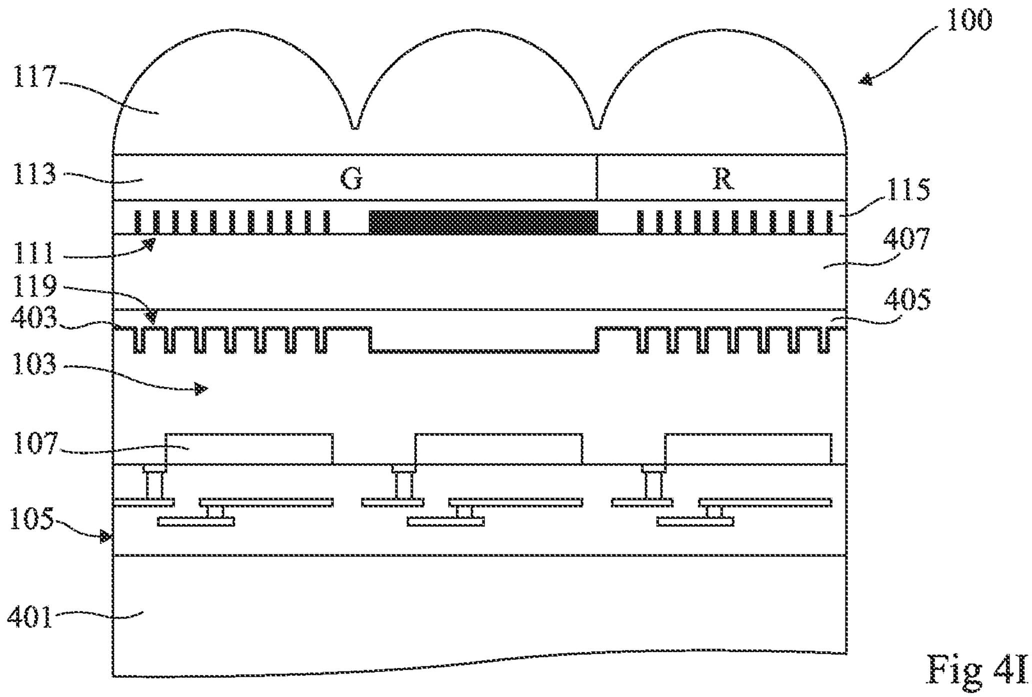

FIG. 4I illustrates the structure obtained at the end of a step of forming of microlenses 117 on the upper surface of the structure of FIG. 4H.

Various embodiments and variants have been described. Those skilled in the art will understand that certain features of these various embodiments and variants may be combined, and other variants will occur to those skilled in the art.

In particular, although examples of forming of back-side illumination (BSI) sensors have been described hereabove, the described embodiments may be adapted to front-side illumination (FSI) sensors. In this case, the photosensitive region of each pixel is illuminated through interconnection stack 105. Diffraction structures 119 are then formed on the side of the front surface (lower surface in the orientation of FIG. 1) of the substrate, before the forming of interconnection stack 105. As an example, the diffraction structures may then be trenches similar to what has been described hereabove, but etched on the front surface side of the substrate. As a variant, the diffraction structures may be formed by pads or bars of polysilicon formed on the front side of the substrate. As an example, the diffraction structures may be formed in the same polysilicon level as that used to form conductive gates of MOS transistors of the sensor pixels. This has the advantage of not requiring an etching of substrate 101 to form diffraction structures 119.

Further, in the case of a front-side illumination sensor, polarization structures 111 may be formed in one or a plurality of metal levels of interconnection stack 105. Here again, this enables to introduce no additional step for the manufacturing of polarization structures 111.

Further, the described embodiments are not limited to the examples disclosed hereabove of forming of polarization structures 111 formed of opaque metal patterns laterally surrounded with a transparent dielectric material. As a variant, polarization structures 111 may be formed based on transparent or semi-transparent materials having an index contrast, to improve the transmission of polarizers. For example, for polarization structures intended to operate in near infrared, for example at a wavelength in the order of 940 nm, silicon patterns, for example, made of amorphous silicon, surrounded with a dielectric material of smaller refraction index, for example, silicon oxide, may be used. For pixels intended to measure visible radiations, silicon nitride or titanium oxide patterns, surrounded with a dielectric material of smaller refraction index, for example, silicon oxide, may be used.

Further, examples of polarizing structures 111 formed on parallel bars having an orientation selected according to the linear polarization direction to be transmitted have been described hereabove. These are sub-wavelength structures which may be called one-dimensional (1D) metasurfaces, since they are structured along a single axis. As a variant, polarization structures 111 may be formed based on two-dimensional metasurfaces (2D) formed of pillars or pads arranged in the form of a two-dimensional array. To obtain the desired polarizing effect, pillars having, in top view, an elongated shape, for example, in a rectangle or an ellipse, according to a direction selected according to the linear polarization direction to be transmitted, will be selected.

Further, it should be noted that, in the above-described examples, polarization structures 111 have a polarization filtering function. In other words, the polarization which is desired to be measured is transmitted by structure 111, while the orthogonal polarization is absorbed or reflected. This results in a loss of light flux in the order of 50% in the case of a depolarized light. As a variant, polarization structures 111 may be sorting structures, adapted to deviating the light differently according to its polarization. Structures 111 adapted to deviating light towards respectively two neighboring photosensitive regions 103 for two orthogonal polarizations may particularly be provided. As an example, in the case of a macropixel M of the type described in relation with FIG. 2, the polarization structures 111 of the four pixels P of the macropixel may be replaced with a single structure 111 extending over the entire surface of the macropixel, adapted to deviating light towards respectively the photosensitive regions 103 of the four pixels P for the four polarizations (0°, 90°, +45°, and −45°) which are desired to be measured.

Such polarization sorting structures, also called polarization routers, may be formed based on two-dimensional (2D) or three-dimensional (3D) metasurfaces. The shape and the sizing of the patterns of the metasurfaces may be determined by means of electromagnetic simulation tools, for example, by using reverse design methods, for example, of the type described in the article entitled "Multifunctional volumetric meta-optics for color and polarization image sensors" of Philip Camayd-Munoz et al. (Vol. 7, No. 4/April 2020/Optica) or in the article entitled "Empowering Metasurfaces with Inverse Design: Principles and Applications" of Zhaoyi Li et al. (https://doi.org/10.1021/acsphotonics.1c01850).

It should further be noted that, in a back-side illumination sensor of the type described in relation with FIG. 1, according to the thickness of substrate 101 and to the wavelength intended to be measured by the pixels, part of the incident light radiation may cross the entire thickness of the substrate and reflect on metal tracks of interconnection stack 105, before being absorbed in the photosensitive region 103 of the pixels.

The reflection on the metal tracks of the interconnection stack may result in at least partially polarizing the light according to a direction depending on the orientation of said metal tracks. Preferably, for each pixel P of the sensor, the metal tracks of interconnection stack 105 located in front of the pixel are oriented according to a direction selected according to the pixel polarization, for example, to favor the polarization of the light reflected according to the polarization orientation intended to be measured by the pixel. Thus, preferably, the metal tracks of interconnection stack 105 located in front of pixels intended to measure different polarizations, have different orientations.

Further, the described embodiments are not limited to the above-described examples of application to visible or near infrared sensors. Other wavelength ranges may take advantage of polarizing pixels. For example, the described embodiments may be adapted to infrared sensors intended to measure radiations of wavelength in the range from 1 to 2 μm, for example, based on InGaAs or on germanium.

Finally, the practical implementation of the described embodiments and variations is within the abilities of those skilled in the art based on the functional indications given hereabove. In particular, those skilled in the art will be capable, based on the indications of the present disclosure, of designing, sizing, and forming the polarization structures and the diffraction structures of the sensor pixels, so that these structure cooperate to obtain the desired effect of improvement of the tradeoff between the sensitivity and the pixel polarization extinction coefficient.

Polarimetric image sensor (100) formed inside and on top of a semiconductor substrate (101), the sensor including a plurality of pixels (P), each may be summarized as including: a photosensitive region (103) formed in the semiconductor substrate (101); a diffraction structure (119) formed on the side of an illumination surface of the photosensitive region (103); and a polarization structure (111) formed on the side of the diffraction structure (119) opposite to the photosensitive region (103).

Said plurality of pixels (P) may include at least first and second pixels adapted to measuring radiations according respectively to first and second distinct polarizations, wherein:

the polarization structure (111) of the first pixel (P) is adapted to mainly transmitting radiations according to the first polarization and the polarization structure (111) of the second pixel (P) is adapted to mainly transmitting radiations according to the second polarization; and the diffraction structure (119) of the first pixel (P) is adapted to favoring the absorption, in the photosensitive region (103) of the pixel, of radiations according to the first polarization over radiations according to the second polarization, and the diffraction structure (119) of the second pixel (P) is adapted to favoring the absorption, in the photosensitive region (103) of the pixel, of radiations according to the second polarization over radiations according to the first polarization.

In each pixel (P), the polarization structure (111) of the pixel may include a plurality of parallel bars.

Said parallel bars are metallic.

In each pixel (P), the diffraction structure (119) of the pixel may include a plurality of cavities or trenches extending vertically in the substrate on the side of the illumination surface of the photosensitive region (103).

Said cavities or trenches may extend down to a depth in the range from 50 to 500 nm.

Said plurality of pixels (P) may include different pixels adapted to measuring radiations in different wavelength ranges, and wherein, in each pixel, the polarization structure (111) and/or the diffraction structure (119) are adapted according to the wavelength range intended to be measured by the pixel.

In each pixel (P), the polarization structure (111) and/or the diffraction structure (119) may be adapted according to the angle of incidence of the radiations received by the pixel.

Sensor (100) may include an interconnection stack covering a surface of the substrate (101) opposite to the diffraction structures (119) and to the polarization structures (111).

The polarization structures (111) may be polarizing filters.

The polarization structures (111) may be polarization routers.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:

a polarimetric image sensor in and on a semiconductor substrate, the sensor including a plurality of pixels, each pixel including:

a photosensitive region in the semiconductor substrate;

a diffraction structure on an illumination surface of the photosensitive region, the diffraction structure including a first pattern; and a polarization structure on the diffraction structure opposite to the photosensitive region, the polarization structure including a second pattern that is different than the first pattern.

2. The device according to claim 1, wherein the plurality of pixels comprises at least first and second pixels adapted to measuring radiations according respectively to first and second distinct polarizations, wherein:

the polarization structure of the first pixel is adapted to mainly transmitting radiations according to the first polarization and the polarization structure of the second pixel is adapted to mainly transmitting radiations according to the second polarization; and the diffraction structure of the first pixel is adapted to favoring the absorption, in the photosensitive region of the pixel, of radiations according to the first polarization over radiations according to the second polarization, and the diffraction structure of the second pixel is adapted to favoring the absorption, in the photosensitive region of the pixel, of radiations according to the second polarization over radiations according to the first polarization.

3. The device according to claim 1, wherein, in each pixel, the polarization structure of the pixel comprises a plurality of parallel bars.

4. The device according to claim 3, wherein the parallel bars are metallic.

5. The device according to claim 1, wherein, in each pixel, the diffraction structure of the pixel comprises a plurality of cavities or trenches extending vertically in the substrate on the side of the illumination surface of the photosensitive region.

6. The device according to claim 5, wherein the cavities or trenches extend down to a depth in the range from 50 to 500 nm.

7. The device according to claim 1, wherein the plurality of pixels comprises different pixels adapted to measuring radiations in different wavelength ranges, and wherein, in each pixel, the polarization structure and/or the diffraction structure are adapted according to the wavelength range intended to be measured by the pixel.

8. The device according to claim 1, wherein, in each pixel, the polarization structure and/or the diffraction structure are adapted according to the angle of incidence of the radiations received by the pixel.

9. The device according to claim 1, comprising an interconnection stack covering a surface of the substrate opposite to the diffraction structures and to the polarization structures.

10. The device according to claim 1, wherein the polarization structures are polarizing filters.

11. The device according to claim 1, wherein the polarization structures are polarization routers.

12. A device, comprising:

a substrate;

a plurality of pixels in the substrate;

a diffraction structure on the plurality of pixels, the diffraction structure including a plurality of first patterns that correspond to the plurality of pixels, a first one of the plurality of first patterns being different from the other adjacent ones of the plurality of first patterns; and a polarization structure on the diffraction structure, wherein the polarization structure includes a plurality of second patterns, the plurality of first patterns being different from the plurality of second patterns.

13. The device of claim 12, comprising a transparent layer between the polarization structure and the diffraction structure.

14. A polarimetric image sensor in and on a semiconductor comprising a macropixel formed in and on a semiconductor substrate, comprising a plurality of pixels, each pixel comprising:

a photosensitive region in the silicon substrate, comprising a photodetection element;

a diffraction structure on an illumination surface of the photosensitive region, the diffraction structure including a first pattern; and a polarization structure on the diffraction structure opposite to the photosensitive region, the polarization structure including a second pattern that is different than the first pattern, wherein the plurality of pixels comprises at least first and second pixels adapted to measuring radiations according respectively to first and second distinct polarizations.

15. The image sensor of claim 14, wherein:

the polarization structure of the first pixel is adapted to mainly transmitting radiations according to the first polarization and the polarization structure of the second pixel is adapted to mainly transmitting radiations according to the second polarization; and the diffraction structure of the first pixel is adapted to favoring the absorption, in the photosensitive region of the pixel, of radiations according to the first polarization over radiations according to the second polarization, and the diffraction structure of the second pixel is adapted to favoring the absorption, in the photosensitive region of the pixel, of radiations according to the second polarization over radiations according to the first polarization.

16. The image sensor of claim 14, wherein the micropixel comprises four adjacent pixels each adapted to measuring light radiation intensities received respectively according to each of four different polarization orientations.

17. The image sensor of claim 16, wherein the four different polarization orientations form 0°, 90°, +45°, and −45° angles, respectively, with respect to a reference direction.

18. The image sensor of claim 14, comprising a plurality of macropixels.

19. The image sensor of claim 18, wherein each micropixel includes the same number of pixels in the same respective positions, wherein the pixel of the same position in each respective micropixel is adapted to mainly transmit the same polarization orientation.

20. The device according to claim 12, wherein the plurality of pixels comprises different pixels adapted to measuring radiations in different wavelength ranges, and wherein, for each pixel, the corresponding first patters and/or the corresponding second pattern are adapted according to the corresponding pixel.

* * * * *